US007124257B2

(12) United States Patent
Brown et al.

(10) Patent No.: US 7,124,257 B2
(45) Date of Patent: Oct. 17, 2006

(54) BUS INTERFACE CONTROLLER FOR DETERMINING ACCESS COUNTS

(75) Inventors: Jeffrey Douglas Brown, Rochester, MN (US); David John Krolak, Rochester, MN (US); Jeffrey Joseph Ruedinger, Rochester, MN (US); Scott Douglas Clark, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 10/313,682

(22) Filed: Dec. 5, 2002

(65) Prior Publication Data
US 2004/0111550 A1 Jun. 10, 2004

(51) Int. Cl.
*G06F 12/00* (2006.01)
(52) U.S. Cl. .............. 711/154; 711/173; 711/147; 711/152; 711/141; 710/100
(58) Field of Classification Search .............. 711/154, 711/173, 147, 152, 118, 141; 710/100, 107, 710/305, 306, 311
See application file for complete search history.

(56) References Cited

U.S. PATENT DOCUMENTS

| 6,088,769 | A | * | 7/2000 | Luick et al. | ................. | 711/141 |
| 6,349,394 | B1 | * | 2/2002 | Brock et al. | ................. | 714/47 |
| 2005/0120183 | A1 | * | 6/2005 | DeSota et al. | ............. | 711/144 |

* cited by examiner

*Primary Examiner*—Kimberly McLean-Mayo
(74) *Attorney, Agent, or Firm*—Carr LLP; Diana R. Gerhardt

(57) ABSTRACT

The present invention provides for an integrated circuit (IC) bus system. A local IC is coupled to a remote IC through a bus interface. A local memory is coupled to the local IC. A bus interface controller is employable to track data transfer requests from the remote IC for data address that are contained within at least one segment of the first partitioned memory range. The bus interface controller is further employable to stop the forwarding of a data transfer request generated within the local IC to the remote IC, if the memory segment count corresponding to the data address of the locally generated data transfer request equals zero.

25 Claims, 3 Drawing Sheets

BUS INTERFACE CONTROLLER FOR DETERMINING ACCESS COUNTS

TECHNICAL FIELD

The invention relates generally to bus interface controllers and, more particularly, to bus interface controllers that selectively block memory transfer queries.

BACKGROUND

Generally, computer buses are devices that are employed to transfer data between a plurality of elements in a computer system, such as between a microprocessor and random access memory, or from a floppy disk drive to a cache. A limiting factor of computer system operation can be the effective rate of data transfer from a bus on one chip to a bus on another chip. Some forms of computer bus architecture allow for the passing of information from an integrated circuit (IC) to another IC through employment of a bus interface.

The bus interface can itself be a further bottleneck for data transfers. In some conventional bus interfaces, when a local cache requests data or makes some other query regarding the data, the data request is automatically forwarded to a remote IC that has caches, irrespective of whether the remote IC has a copy of the requested information. Furthermore, the remote IC responds to the data query and sends indicia of the status of the remote caches pertaining to whether or not each of the remote cache has the requested information. This continuous transfer of control data can lead to inefficiencies of design and use, as remote cache queries and responses are passed between the local IC and the remote IC through the bus interface.

Therefore, a bus interface system is needed that overcomes some of the deficiencies of conventional bus interface systems.

SUMMARY OF THE INVENTION

The present invention provides for an integrated circuit (IC) bus system. A local IC is coupled to a remote IC. A local memory is coupled to the local IC. A bus interface controller is employable to track data transfer requests from the remote IC for data address that are contained within at least one segment of a local memory range. The bus interface controller is further employable to stop the forwarding of a data transfer request generated within the local IC to the remote IC, if a memory segment count correlated to the data address of the locally generated data transfer request equals zero.

In one aspect, the bus interface controller further comprises an incrementer. The incrementer is employable to increment the memory segment count for each request the bus interface controller receives for a data transfer corresponding to a segment of the local partitioned memory, if the request for the data transfer is generated by the remote IC.

In another aspect, the bus interface controller further comprises a decrementer. The decrementer is employable to decrement the memory segment count for each processing finished signal for a segment of the local partitioned memory range, if the processing finished signal is received from the remote IC.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
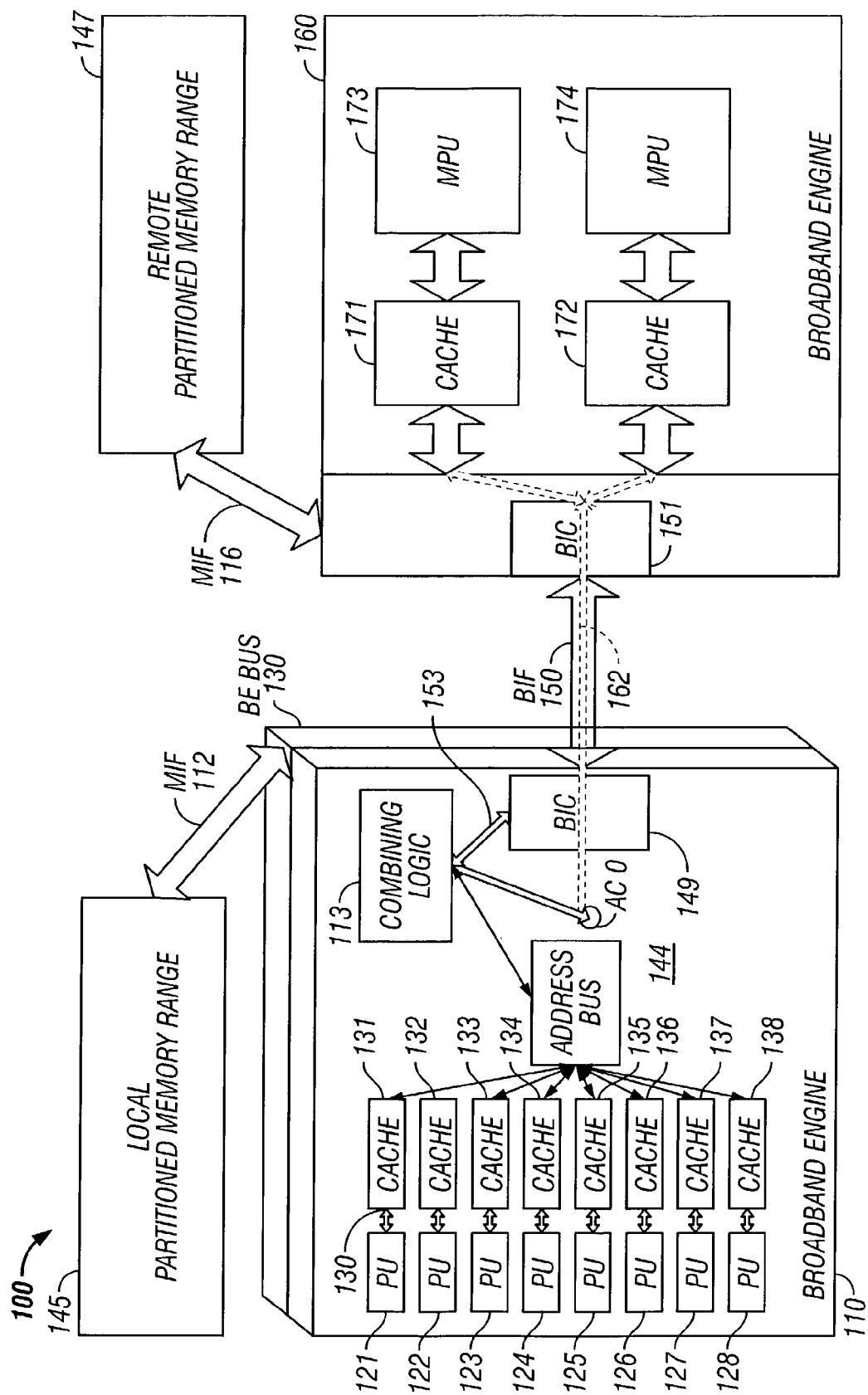
FIG. 1 schematically illustrates a local IC coupled through a bus interface to a remote IC.

Referring to FIG. 1, disclosed is a coupled integrated circuit (IC) system 100. The system 100 comprises a local IC 110 and a remote IC 160 coupled by a bus interface (BIF) 150. In one embodiment, the local IC 110 and the remote IC 160 are broadband engine (BE) ICs. The BIF 150 is coupled to local and remote BIF controllers (BIC) 149, 151, respectively. Generally, the BIC 149 monitors traffic on an address bus 144 to determine whether or not to forward a request for data, generated on the local IC 110, to the remote IC 160.

The local BIC 149 is coupled through a BIC controller bus 153 to combining logic 113. Generally, the combining logic 113 determines and controls the transfer of data as a function of the various transfer queries and the cache investigation reports it received. Local IC 110 is coupled to a local partitioned memory range 145 through a memory interface (MIF) 112, and the remote IC 160 is coupled to a remote memory range 147 through an MIF 116.

The local IC 110 comprises a plurality of processor units (PU) 121 to 128. Each PU 121 to 128 is coupled to its own cache 131 to 138 by a PU cache bus 130. In one embodiment, the PU cache bus 130 is part of a broadband engine (BE) bus (BEB) 130. For ease of illustration, in FIG. 1, the BEB 130 is generally depicted as a cutaway element of a lower layer of a 3-dimensional rendition of the IC chip 110. However, those of skill in the art will understand that other placements and configurations of the BEB 130 are within the scope of the present invention.

Typically, the BE bus 130 comprises two buses. These buses are the data bus (not shown) and the address bus 144. For both the local IC 110 and the remote IC 160, these comprise the address bus 144. The address bus 144 is coupled to the caches 131 to 138 and the combining logic 113.

Generally, each IC 110, 160 has associated with it a unique partitioned memory range 145, 147, respectively. The local partitioned memory range 145 is subdivided into a plurality of memory segments. For instance, if the local partitioned memory range 145 corresponds to the memory address ranges of 5000 to 6000, a first segment could correspond to range 5000 to 5099, a second segment from 5100 to 5199, a third segment from 5200 to 5299, and so on.

In FIG. 1, as will be understood by those of skill in the art, there are at least four states for data that is stored in a cache 131 to 138 of the local IC 110, or caches 171 and 172 of the remote IC 160. These states are the "invalid" state, the "exclusive" state, the "modified" state, and the "shared" state. In the system 100, whenever a cache 131–138 or 171, 172 first gets information from either the local partitioned memory 145 or the remote partitioned memory 147, this information is designated as exclusive to that cache, because that cache is the only cache that has the desired information.

If a cache is to have modified data stored within, then the cache determines whether it has an exclusive or shared status. If the cache has an exclusive status, the cache modifies the data with typically no indicia of this modification forwarded to any other cache, and the data status is changed to "modified." However, if the data is shared, the cache that is to have modified data stored within notifies any caches that are tagged as shared for that data cache line that the shared data is to be modified. The most recent version of the modified data is loaded into the modifying cache, and that modified data is then transmitted to the other shared cache. After this modification, the data is still deemed "modified."

However, if a second cache is to load information associated with a given memory address, the second cache determines whether any other cache has data corresponding to that memory address. If another cache has that same information, then the second cache can download the information from that cache, or from the appropriate local and remote memories 145 and 147 if the information has not been modified. In either event, this information is then designated as "shared" at both caches.

In FIG. 1, a PU of the PUs 121–128 requests data having a particular memory address corresponding to a particular cache line. The data request traverses down to the address concentrator to AC 0. This request for a data address is then transmitted to the local caches 131–138 back up the address bus 144. Integrated within each cache 131–138 is its own associated cache investigation device. Generally, the cache investigation device determines whether or not its associated cache 131–138 has the data corresponding to the requested data address. The indicia corresponding to whether or not a given cache 131–138 has the information is passed down the data bus 144 to AC0. The output of the cache investigations devices is processed by the combining logic 113 to coordinate any necessary data transfers on the data bus of the BEB 130 and from the local partitioned memory 145 and the remote partitioned memory 147.

However, the BIC 149 acts as a gateway that determines whether on not to transmit a request for a data address to the remote IC 160. This is performed by the BIC 149 examining memory segment counts within the BIC 149. In FIG. 1, whenever the PU 173–174 of the remote IC 160 requests an address range that falls within the local partitioned memory range 145, the BIC 149 increments a memory segment count associated with this memory segment. The information is also substantially simultaneously requested from the local partitioned memory range 145 by the combining logic 113. Also, the data is requested, through employment of a reverse cache investigation tree on the address bus 144, from the caches 171 and 172 within the remote IC 160. For instance, the remote IC 160 requests memory address 5144, which is within the local partitioned memory range of memory addresses 5000–6000. The remote IC 160 queries the caches 131–138 to see if they have that memory address, as well as its own caches 171, 172.

Whenever an update for data address that is not associated with the local memory 145 occurs, this request is transmitted across the BIF 150 by the BIC 149. In other words, a request for data associated with the remote partitioned memory 147 is typically forwarded by the BIC 149 to the remote IC 160. However, if the memory address requested through the AC 0 on the local IC 110 is associated with the local partitioned memory 145, the BIC 149 looks at the memory segment count associated with that memory address. If the memory segment count is one or higher, then the data request is also forwarded to the remote IC 160. This is generally because a count greater than zero indicates that a remote cache 171, 172 has information associated with that memory address stored within it, and therefore those caches 171, 172 are to be queried before a data transfer to the requesting cache can occur. In one embodiment, the query occurs in order to determine whether the data within the remote caches 171, 172 has been modified. If the requested data has been modified, a copy of the modified data is to be transferred over the BIF 150 to the requesting cache.

However, if the memory segment count equals zero for a given memory segment of the local partitioned memory range 145, then the BIC 149 determines that there are no remote caches 171, 172 containing information corresponding to that memory address. Therefore, because by definition the remote IC 160 does not have a copy of the queried data, the query concerning this data is not transmitted to the remote IC 160. Not transmitting this query concerning data can save bandwidth across the BIF 150, as requests for information from the local IC 110 to the remote IC 160 all pertain to information that is either in the remote partitioned memory 149 or stored in the remote caches 171 and 172.

In one embodiment, the caches 131–138 and caches 171, 172 are employable to transmit a processing finished signal on the BE bus 130 that the given cache 171, 172 is finished with a certain data, and that the data is no longer to be processed by its associated PU 121–128 and 173–174 without further instructions to do so from the memory 145, 147.

Generally, the processing finished signal can be employed by the BIC 149 to decrement the memory segment count correlating to the data address with which the cache is finished, if the processing finished signal source is the remote cache 171, 172, and the memory address is found within the range of the partitioned local memory 145. For instance, in the illustrated embodiment, if the processing finished signal corresponding to a memory address is 5112, and the source of the processing finished signal is the remote cache 171 or 172, the BIC 149 decrements the total segment count for the 5100–5200 memory segment range. If the total count is zero, then there are no copies of data corresponding to that memory segment in the remote IC 160. The BIC 149 therefore blocks the transmission of this request to the remote IC 160, thereby reducing BIF 150 traffic. In one embodiment, the processing finished signal happens when no copy of the data is to be held on the remote node by the unit issuing it. Other units still hold the data, and the segment count reflects this.

In a further embodiment, the system 100 is employable as a filter to keep external traffic between a remote device and remote memory off a local IC bus, and into a separate bus structure. For example, an internal IC bus and the remote bus are uncoupled. That is, there are no shared AC O between the two buses. In one embodiment, each bus has its own AC 0. Therefore, the BIC 149 is employable as a bridge between the two buses. The BIC 149 is employable to count the number of accesses to a particular remote memory range that occur on the internal IC bus. If the remote bus shows a remote APU accessing remote memory for which the local IC access count is zero, no query of the internal bus to determine a cache state of that memory access occurs. However, if the count is non-zero, the BIC 149 is configured to transmit the remote memory access request to the local IC bus to query the cache state.

Then, if the local IC bus reports that the memory range is no longer needed, an "invalid" notification decrements the count associated with the BIC 149. When this count is zero, a remote access request to that memory range is not passed to the local IC bus. Therefore, the BIC 149 is acting as a bus filter. However, in this further embodiment, the BIC 149 is employable to keep traffic off the internal IC bus rather than keeping it off the external bus.

Figure 2A:
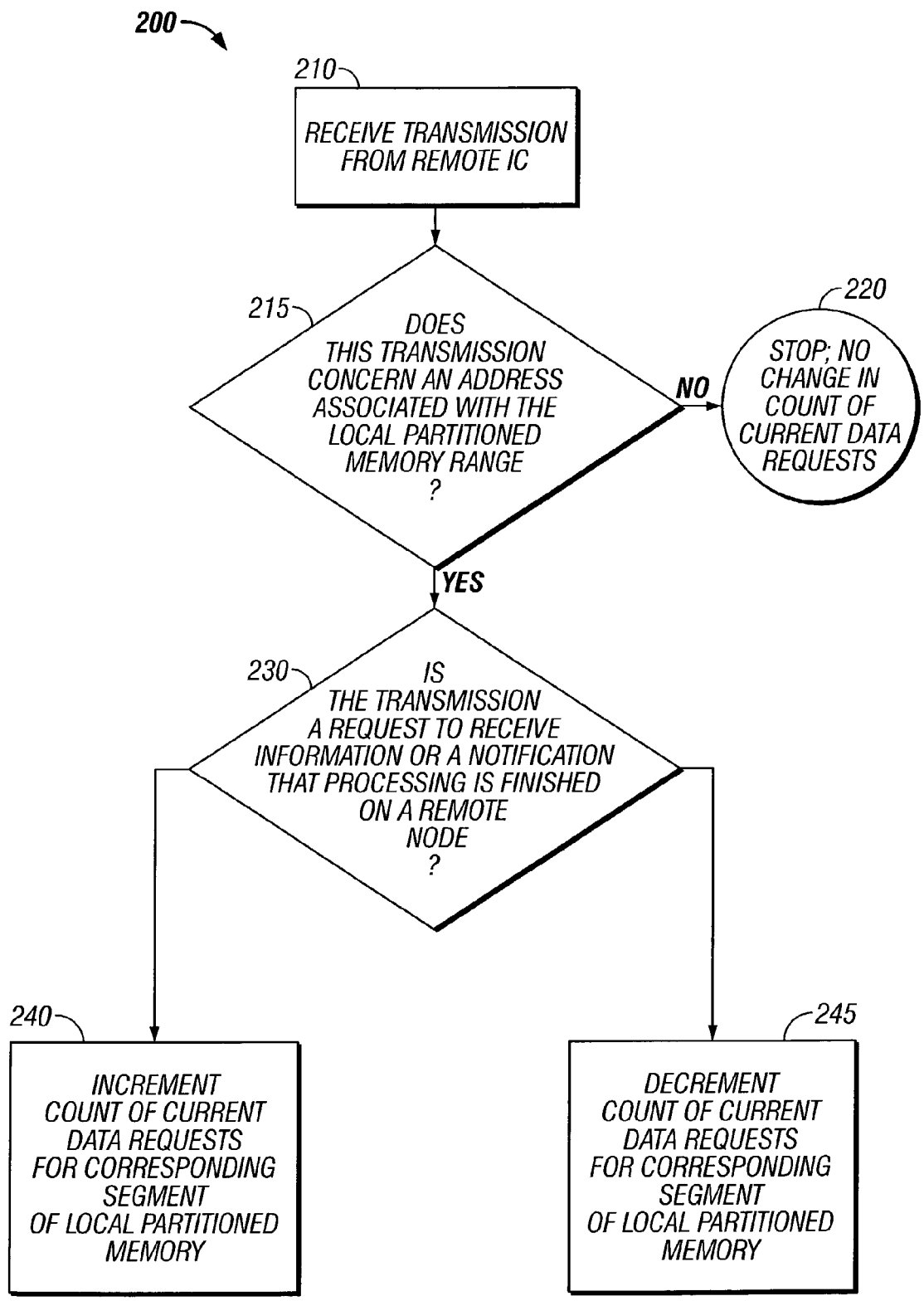
FIG. 2A illustrates a method for tracking the total number of counts for a given memory segment by the bus interface controller.

Turning now to FIG. 2A, disclosed is a method 200 for determining the total count for a given local memory segment by the BIC 149. In the system 100, the BIC 149 is generally employable to block certain data transfer requests from the local IC 110 to the remote IC 160. In step 210, the BIC 149 receives a transmission from the remote BE 160 querying data a memory address. In step 215, the BIC 149 determines whether the data transfer request received from the remote IC 160 corresponds to an address of the local partitioned memory range 145. The BIC 149 forwards the request up the data address bus 144. If the data address of the data address request does not correspond to the local partitioned memory range 145, the BIC 149 neither increments nor decrements its count for the corresponding memory segment range in step 220.

However, if the transmission data query does correspond to an address within the local partitioned memory range 145, the BIC 149 then determines if the received transmission is either a request to receive information about the memory address, or a notification that a remote cache 171, 172 is finished storing the current version of the information corresponding to that memory address. If the transmission is a request for a data transfer, the memory segment count corresponding to that memory address is incremented in step 240. If the transmission is a notification that the remote cache 171, 172 is finished storing the current version, the memory segment count corresponding to that memory address is decremented in step 245.

Figure 2B:
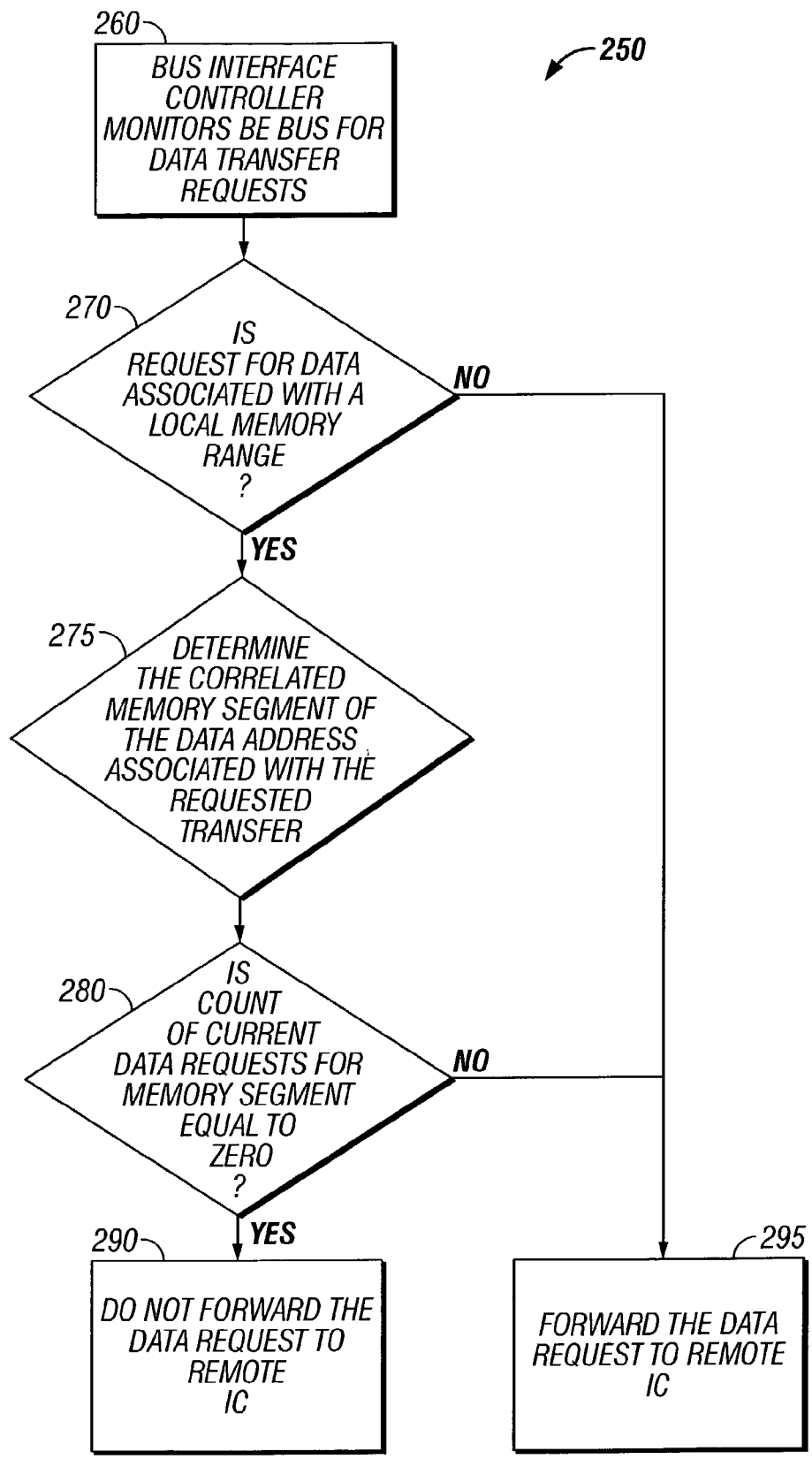
FIG. 2B illustrates a method for employing the total number of counts for a given memory segment by the bus interface controller to determine whether or not to forward a data request to the remote IC.

Turning now to FIG. 2B, illustrated is a method 250 for employing the BIC 149 to determine whether or not to forward a cache request generated on the local IC 110 to the remote IC 160. In step 260, the BIC 149 monitors the local IC bus 110 for data transfer queries generated within the IC 110. In step 270, the BIC 149 receives a locally generated data query. The BIC 149 determines whether the address of the data query falls within the memory range of the local partitioned memory 145. If the address of the locally generated data transfer request does not fall within the memory range of the local partitioned memory 145, the BIC 149 forwards the data transfer request to the remote IC 160 in step 295.

However, if the requested address does fall within the range of the partitioned local memory 145, step 275 determines to which memory segment of the local memory 145 the data address query corresponds. Step 280 determines whether the total segment count for the corresponding memory segment equals zero. If the count does not equal zero, then the address request is again forwarded to the remote IC 160 in step 295. However, if the total segment count does equal zero, then the address request is not forwarded to the remote IC 160 in step 295.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. An integrated chip (IC) bus system, comprising:
    a local IC;
    a remote IC coupled to the local IC;
    a local memory coupled to the local IC;
    a bus interface controller, employable to track a data query from the remote IC for data address that are contained within at least one segment of a first partitioned memory range, the bus interface controller further employable to stop a forwarding of a data query generated within the local IC to the remote IC, if a memory segment count corresponding to the data address associated with the locally generated data transfer query equals zero; and
    a means for incrementing the memory segment count in response to a query the bus interface controller receives for a data transfer from the remote IC and decrementing the memory segment count in response to a processing finished sianal from the remote IC.

2. The bus interface controller of claim 1, further comprising an incrementer that is employable to increment the memory segment count for each query the bus interface controller receives for a data transfer, corresponding to a segment of the local partitioned memory, if the request for the data transfer is generated by the remote IC.

3. The bus interface controller of claim 1, further comprising a decrementer that is employable to decrement the memory segment count for each processing finished signal associated with a segment of the local partitioned memory range, if the processing finished signal is received from the remote IC.

4. The system of claim 1, further comprising a plurality of processing units coupled to the local IC.

5. The system of claim 4, wherein the plurality of processing units coupled to the local IC are each employable to create the locally generated data query.

6. The system of claim 1, further comprising a plurality of processing units coupled to the remote IC.

7. The system of claim 6, wherein the plurality of processing units coupled to the remote IC are employable to create the remotely generated data query.

8. The system of claim 6, wherein the bus interface controller does not alter the memory count if the data transfer request was locally generated.

9. The system of claim 1, further comprising a combining logic employable to perform data transfers.

10. The system of claim 1, further comprising a bus interface interposed between the local IC and the remote IC.

11. The system of claim 1, further comprising a cache coupled to at least one of the plurality of processing units.

12. The system of claim 11, wherein the cache comprises a cache investigation device.

13. The system of claim 1, wherein the data query is targeted to a cache line.

14. The system of claim 1, further comprising an address concentrator node, coupled to a plurality of caches and further coupled to the bus interface controller.

15. The system of claim 1, wherein the local memory comprises a plurality of memory segments.

16. The system of claim 1, wherein the bus interface controller is further employable to keep external traffic between a remote device and remote memory off the local IC bus.

17. A method of tracking a memory segment count, comprising:
 receiving indicia from a remote IC by a bus interface controller;
 determining if the indicia is found correlates to an address within a local memory address range;
 if the indicia is associated with a local memory address, determining if the indicia is a request to receive a data transfer;
 if the indicia comprises a request to receive a data transfer, incrementing a memory segment count correlated to the data address associated with the request to receive data; and
 if the indicia comprises a processing finished signal, decrementing the memory segment count.

18. The method of claim 17, further comprising a step of broadcasting from the bus interface controller the remotely generated address request to a local cache.

19. The method of claim 17, further comprising a step of retaining the memory segment count if the remotely generated data transfer request is not found within the local memory request range.

20. The method of claim 17, wherein the step of incrementing a memory segment count further comprises incrementing one of a plurality of memory segment counts, wherein each of the plurality of memory segment counts are associated with a memory segment of the local memory.

21. A method of employing a segment memory count in a bus interface controller, comprising:
 monitoring a local bus for a locally generated data query;
 determining whether the locally generated data query is associated with a data address that falls within a local memory range;
 if the locally generated data transfer query is associated with the data address that falls within the local memory range, determining the a corresponding memory segment;
 determining if a corresponding memory segment count, associated with the determined memory segment, is equal to zero, wherein the memory segment count is incremented in response to a data query for the determined memory segment and is decremented in response to a processing finished signal; and
 if the corresponding memory segment count is equal to zero, refraining from forwarding the data query to a remote IC.

22. The method of claim 21, further comprising forwarding the data query from a local IC to a remote IC if the corresponding memory segment count is not equal to zero.

23. The method of claim 21, further comprising forwarding the data query from a local IC to a remote IC if the data transfer request does not have a data address within the memory range of the local memory.

24. A computer program product for tracking a memory segment count, the computer program product having a medium with a computer program embodied thereon, the computer program comprising:
 computer code for receiving indicia from a remote IC by a bus interface controller; computer code for determining if the indicia correlates to an address within a local memory address range;
 computer code for determining if the indicia is a data query, if the indicia is associated with a local memory address;
 computer code for incrementing a memory segment count correlating to the data address associated with the data query, if the indicia also comprises a data query; and
 computer code for decrementing the memory segment count, if the indicia comprises a processing finished signal.

25. A processor for employing a segment memory count in a bus interface controller, the processor including a computer program comprising:
 computer code for monitoring a local bus for a locally generated data query;
 computer code for determining whether the locally generated data query is associated with a data address that falls within a local memory range;
 computer code for determining a corresponding memory segment, if the locally generated data query is also associated with the data address that falls within the local memory range;
 computer code for determining if a corresponding memory segment count, associated with the determined memory segment, is equal to zero, wherein the memory segment count is incremented in response to a data query for the determined memory segment and is decremented in response to a processing finished signal; and
 computer code for refraining from forwarding the data query to a remote IC if the corresponding memory segment count is equal to zero.

* * * * *